US009915781B1

(12) United States Patent
Lin (10) Patent No.: US 9,915,781 B1
(45) Date of Patent: Mar. 13, 2018

(54) SILICON-WAVEGUIDE-BASED BROADBAND POLARIZATION SPLITTER-ROTATOR

(71) Applicant: INPHI CORPORATION, Santa Clara, CA (US)

(72) Inventor: Jie Lin, Santa Clara, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

(21) Appl. No.: 15/472,156

(22) Filed: Mar. 28, 2017

(51) Int. Cl.
*G02B 6/126* (2006.01)
*G02B 6/122* (2006.01)
*G02B 6/27* (2006.01)
*G02B 6/28* (2006.01)
*G02B 6/125* (2006.01)
*G02B 6/12* (2006.01)

(52) U.S. Cl.
CPC .......... *G02B 6/126* (2013.01); *G02B 6/125* (2013.01); *G02B 6/1228* (2013.01); *G02B 6/2726* (2013.01); *G02B 6/2766* (2013.01); *G02B 6/2773* (2013.01); *G02B 6/2813* (2013.01); *G02B 2006/12061* (2013.01); *G02B 2006/12097* (2013.01)

(58) Field of Classification Search
CPC .... G02B 6/126; G02B 6/1228; G02B 6/2726; G02B 6/2773; G02B 6/2813; G02B 6/125; G02B 6/2766; G02B 2006/12061; G02B 2006/12097
See application file for complete search history.

(56) References Cited

U.S. PATENT DOCUMENTS

| 8,131,120 | B2* | 3/2012 | Doerr | G02B 6/105 385/11 |
| 8,873,899 | B2* | 10/2014 | Anderson | G02B 6/27 385/11 |
| 9,069,194 | B2* | 6/2015 | Onishi | G02F 1/0136 |
| 9,557,482 | B2* | 1/2017 | Oka | G02B 6/105 |
| 9,618,821 | B2* | 4/2017 | Jewart | G02F 1/2257 |
| 2017/0068048 | A1* | 3/2017 | Kamei | G02B 6/126 |
| 2017/0075063 | A1* | 3/2017 | Brouckaert | G02B 6/126 |

* cited by examiner

*Primary Examiner* — Ryan Lepisto
(74) *Attorney, Agent, or Firm* — Richard T. Ogawa; Ogawa P.C.

(57) ABSTRACT

A waveguide-based polarization splitter-rotator (PSR) includes a converter with tapered rib-structure configured to convert TM0/TE0 polarization mode of an input light to a TE1/TE0 mode, a splitter coupled to the first plane for splitting the input light evenly to a first wave at a first port and a second wave at a second port. Furthermore, the PSR includes a phase shifter having a first arm coupled to first port and a second arm coupled to the second port. The first arm guides the first wave to a third port with no phase shift while the second arm adds 90 or 270 degrees to the second wave. The PSR also includes a 2×2 MMI coupler for coupling the first wave and the second wave to output a first output light in TE0 mode exclusively from TM0 mode and a second output light in TE0 mode exclusively from TE0 mode.

22 Claims, 8 Drawing Sheets

SILICON-WAVEGUIDE-BASED BROADBAND POLARIZATION SPLITTER-ROTATOR

BACKGROUND OF THE INVENTION

The present invention relates to a broadband communication device. More particularly, the present invention provides a Si-waveguide-based broadband polarization splitter-rotator with low loss and high extinction ratio for polarization-independent silicon photonics communication systems.

Over the last few decades, the use of broadband communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

Silicon photonics has become very popular for these applications because of the potential to combine high performance with low-cost fabrication. In addition, polarization multiplexing is another attractive, low-cost, and simple way to increase transmission capacity. Polarization splitter-rotator (PSR) is a key element for polarization management in next generation polarization-independent silicon photonics circuits. A polarization splitter-rotator preferred for photonic integrated circuits (PICs) should simultaneously have features like compact size, high extinction ratio, low insertion loss, broadband range, stability, simple structure and high tolerances in manufacture. Conventional polarization splitter-rotator is either wavelength sensitive (not suit for broadband operation) or based on prism (hard to be made in super compact size).

Therefore, it is desired to develop improved compact polarization splitter-rotator that is low insertion loss and wavelength insensitive across entire C-band or O-band window for the integrated silicon photonics circuits.

BRIEF SUMMARY OF THE INVENTION

The present invention relates to photonic broadband communication device. More particularly, the present invention provides a broadband polarization splitter-rotator. Merely by example, the present invention discloses a compact polarization splitter-rotator configured as all silicon waveguide structures for converting a light mixed with both TM mode and TE mode to split to two lights of TE mode respectively at two output ports. The compact polarization splitter-rotator can be integrated in Si photonics circuits for broadband polarization-independent communication system, though other applications in other wavelength are possible.

In modern electrical interconnect systems, high-speed serial links have replaced parallel data buses, and serial link speed is rapidly increasing due to the evolution of CMOS technology. Internet bandwidth doubles almost every two years following Moore's Law. But Moore's Law is coming to an end in the next decade. Standard CMOS silicon transistors will stop scaling around 5 nm. And the internet bandwidth increasing due to process scaling will plateau. But Internet and mobile applications continuously demand a huge amount of bandwidth for transferring photo, video, music, and other multimedia files. This disclosure describes techniques and methods to improve the communication bandwidth beyond Moore's law.

In an embodiment, the present invention provides a polarization splitter-rotator for broadband operation. The polarization splitter-rotator includes a converter comprising a rib structure waveguide with symmetrically tapered shapes extended in a lengthwise direction from an input port to a first cross-section plane. The converter is configured to guide an input light with mixed Transverse Magnetic (TM0) polarization mode and Transverse Electric (TE0) polarization mode from the input port to the first cross-section plane with the TM0 mode being coupled to the first order Transverse Electric (TE1) mode and the TE0 mode remained as the zero order TE0 mode. Further, the polarization splitter-rotator includes a splitter comprising a planar waveguide extended further in the lengthwise direction from the first cross-section plane to a second cross-section plane having a first port and a second port separated from each other. The splitter is configured to split the input light substantially evenly in power to a first wave at the first port and a second wave at the second port. Additionally, the polarization splitter-rotator includes a phase-shifter comprising a first waveguide arm coupled to the first port and a second waveguide arm coupled to the second port. The first waveguide arm is extended in the lengthwise direction from the first port to a third port of a third cross-section plane and configured to keep the first wave at the third port in-phase relative to that at the first port. The second waveguide arm is separately extended in the lengthwise direction from the second port to a fourth port of the third cross-section plane and configured to add a phase shift to the second wave at the fourth port relative to that at the second port. Furthermore, the polarization splitter-rotator includes a 2×2 Multimode Interference (MMI) coupler extended further in the lengthwise direction from the third cross-section plane to an output plane having a first output port and a second output port disposed respectively in bar position relative to the third port and the fourth port. The 2×2 MMI coupler is configured to separately output a first output light in TE0 mode substantially originated from the input light in TE0 mode and a second output light in TE0 mode substantially originated from the input light in TM0 mode.

In an alternative embodiment, the present invention provides an integrated silicon-photonics polarization-division transceiver comprising a polarization splitter-rotator in either its transmitter output path or receiver input path to handling light wave of wavelengths in certain range of O-band. Each polarization splitter-rotator includes a converter waveguide having a rib structure with symmetrically tapered shapes extended in a lengthwise direction from an input port to a first cross-section plane. The converter waveguide is configured to guide an input light with mixed Transverse Magnetic (TM0) polarization mode and Transverse Electric (TE0) polarization mode from the input port to the first cross-section plane with the TM0 mode being coupled to a first order Transverse Electric (TE1) mode and the TE0 mode being remained as a zero order TE0 mode. Further, the polarization splitter-rotator includes a splitter comprising a planar waveguide extended further in the lengthwise direction from the first cross-section plane to a second cross-section plane having a first port and a second port separated from each other. The splitter is configured to split the input light substantially evenly in power to a first wave at the first port and a second wave at the second port. Additionally, the polarization splitter-rotator includes a phase-shifter comprising a first waveguide arm coupled to the first port and a second waveguide arm coupled to the second port. The first waveguide arm is extended in the lengthwise direction from the first port to a third port of a third cross-section plane and configured to keep the first wave at the third port in-phase relative to that at the first port. The second waveguide arm is separately extended in the lengthwise direction from the second port to a fourth port of the third cross-section plane and configured to add a phase shift of $(1/2)\pi$ or $(3/2)\pi$ to the second wave at the fourth port relative to that at the second port. Furthermore, the polarization splitter-rotator includes a 2×2 Multimode Interference (MMI) coupler extended further in the lengthwise direction from the third cross-section plane to an output plane having a first output port and a second output port disposed respectively in bar position relative to the third port and the fourth port. The 2×2 MMI coupler is configured to separately output a first output light in TE0 mode substantially originated from the input light in TE0 mode and a second output light in TE0 mode substantially originated from the input light in TM0 mode.

Optionally, the first output light in TE0 mode just suffers a transmission loss less than 1.7 dB relative to the input light in TM0 mode with wavelengths in a broad range of 1260 nm-1340 nm and the second output light in TE0 mode merely suffers a transmission loss less than 1.5 dB relative to the input light in TE0 mode with wavelengths in the same range of 1260 nm-1340 nm. The first output light and the second output light are respectively outputted via the first output port and the second output port with an extinction ratio no smaller than 16 dB.

In another alternative embodiment, the present invention provides an integrated silicon-photonics polarization-division transceiver comprising a polarization splitter-rotator in either its transmitter output path or receiver input path to handling light wave of wavelengths in certain range of C-band. Each polarization splitter-rotator includes a converter waveguide having a rib structure with symmetrically tapered shapes extended in a lengthwise direction from an input port to a first cross-section plane. The converter waveguide is configured to guide an input light with mixed Transverse Magnetic (TM0) polarization mode and Transverse Electric (TE0) polarization mode from the input port to the first cross-section plane with the TM0 mode being coupled to a first order Transverse Electric (TE1) mode and the TE0 mode being remained as a zero order TE0 mode. Further, the polarization splitter-rotator includes a splitter comprising a planar waveguide extended further in the lengthwise direction from the first cross-section plane to a second cross-section plane having a first port and a second port separated from each other. The splitter is configured to split the input light substantially evenly in power to a first wave at the first port and a second wave at the second port. Additionally, the polarization splitter-rotator includes a phase-shifter comprising a first waveguide arm coupled to the first port and a second waveguide arm coupled to the second port. The first waveguide arm is extended in the lengthwise direction from the first port to a third port of a third cross-section plane and configured to keep the first wave at the third port in-phase relative to that at the first port. The second waveguide arm is separately extended in the lengthwise direction from the second port to a fourth port of the third cross-section plane and configured to add a phase shift of $(1/2)\pi$ or $(3/2)\pi$ to the second wave at the fourth port relative to that at the second port. Furthermore, the polarization splitter-rotator includes a 2×2 Multimode Interference (MMI) coupler extended further in the lengthwise direction from the third cross-section plane to an output plane having a first output port and a second output port disposed respectively in bar position relative to the third port and the fourth port. The 2×2 MMI coupler is configured to separately output a first output light in TE0 mode substantially originated from the input light in TE0 mode and a second output light in TE0 mode substantially originated from the input light in TM0 mode.

Optionally, the first output light in TE0 mode just suffers a transmission loss less than 1.3 dB relative to the input light in TE0 mode with wavelengths in a range of 1525 nm-1565 nm and the second output light in TE0 mode just suffers a transmission loss less than 1.4 dB relative to the input light in TM0 mode with wavelengths in the same range of 1525 nm-1565 nm. The first output light and the second output light are respectively outputted via the second output port and the first output port with an extinction ratio no smaller than 19 dB.

In yet another embodiment, the present invention provides a polarization-independent silicon photonics communication system comprising an integrated polarization-division transceiver coupled to a polarization splitter-rotator in either a transmitter output path or a receiver input path. The polarization splitter-rotator includes a converter comprising a rib structure waveguide with symmetrically tapered shapes extended in a lengthwise direction from an input port to a first cross-section plane. The converter is configured to guide an input light with mixed Transverse Magnetic (TM0) polarization mode and Transverse Electric (TE0) polarization mode from the input port to the first cross-section plane with the TM0 mode being converted to a first order Transverse Electric (TE1) mode and the TE0 mode remained as a zero order TE0 mode. Further, the polarization splitter-rotator includes a splitter comprising a planar waveguide extended further in the lengthwise direction from the first cross-section plane to a second cross-section plane having a first port and a second port separated from each other. The splitter is configured to split the input light substantially evenly in power to a first wave at the first port and a second wave at the second port. Additionally, the polarization splitter-rotator includes a phase-shifter comprising a first waveguide arm coupled to the first port and a second waveguide arm coupled to the second port. The first waveguide arm is extended in the lengthwise direction from the first port to a third port of a third cross-section plane and configured to keep the first wave at the third port in-phase relative to that at the first port. The second waveguide arm is separately extended in the lengthwise direction from the second port to a fourth port of the third cross-section plane and configured to add a phase shift to the second wave at the fourth port relative to that at the second port. Furthermore, the polarization splitter-rotator includes a 2×2 Multimode Interference (MMI) coupler extended further in the lengthwise direction from the third cross-section plane to an output plane having a first output port and a second output port disposed respectively in bar position relative to the third port and the fourth port, and configured to separately output a first output light in TE0 mode substantially originated from the input light in TE0 mode and a second output light in TE0 mode substantially originated from the input light in TM0 mode. Optionally, as the second waveguide arm of the phase shifter is configured to add $(1/2)\pi$ to the second wave, the first output light in TE0 mode suffers a transmission loss less than 1.7 dB relative to the input light in TM0 mode for a broad O-band wavelengths between 1260 nm and 1340 nm or C-band wavelengths between 1525 nm and 1565 nm, and the second output light in TE0 mode also just suffers less than 1.7 dB insertion loss relative to input light in TE0 mode. Alternatively, as the second waveguide arm of the phase shifter is configured to add $(3/2)\pi$ to the second wave, the first output light in TE0 mode suffers a transmission loss less than 1.7 dB relative to the input light in TE0 mode for a broad O-band wavelengths between 1260 nm and 1340 nm or C-band wavelengths between 1525 nm and 1565 nm, and the second output light in TE0 mode also just suffers less than 1.7 dB insertion loss relative to input light in TM0 mode. The first output port and the second output port are associated with an extinction ratio no smaller than 16 dB for TE-to-TE split-conversion versus TM-to-TE split-conversion.

Many benefits associated with a polarization-independent silicon photonics communication system can be achieved with this compact polarization splitter-rotator in the present disclosure. The polarization splitter-rotator is a key element for polarization management in next-generation integrated silicon photonics systems. The polarization splitter-rotator in the current disclosure is compact in size with simple structure adaptive to convenient manufacture process, and highly tolerant in process variation conducted on silicon-on-insulator (SOI) substrate, which are all crucial for the integration of photonics communication systems. The polarization splitter-rotator in the current disclosure is characterized by a robust Si-waveguide design with less than 1.7 dB transmission loss and greater than 16 dB extinction ratio for splitting TM mode and TE mode to two separate output ports with both being converted to TE mode. The combined mode-splitting and mode-rotation functions of the PSR are substantially insensitive to wavelengths over at least 40 nm in O-band or C-band.

The present invention achieves these benefits and others in the context of known polarization transmitting/receiving technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

The present invention relates to photonic broadband communication device. More particularly, the present invention provides a broadband polarization splitter-rotator. Merely by example, the present invention discloses a compact polarization splitter-rotator configured with all silicon waveguide structures convert a beam mixed with both TM0 mode and TE0 mode to split to two beams of TE0 mode respectively at two output ports. The compact polarization splitter-rotator can be integrated in Si photonics circuits for broadband polarization-independent communication system, though other applications in other wavelength and are possible.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Figure 1A:
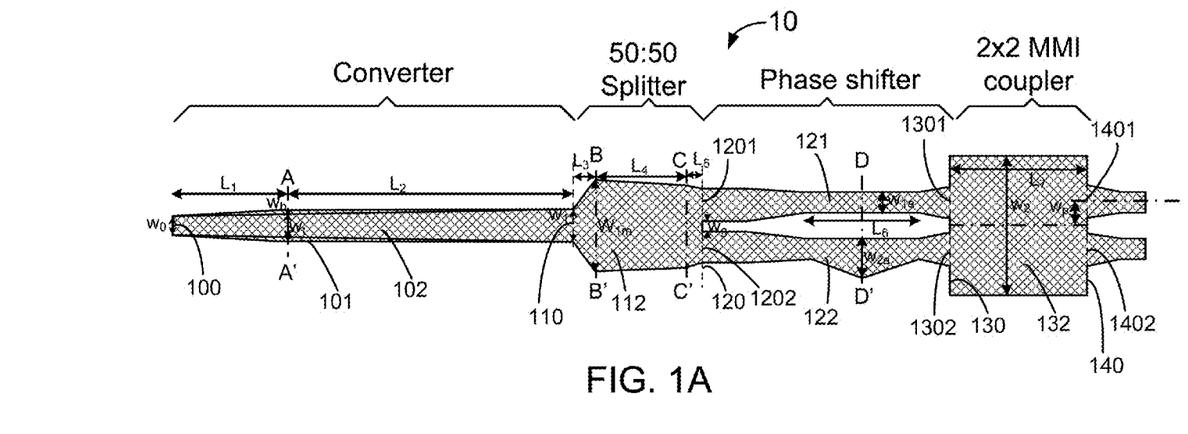
FIG. 1A is a top-view diagram of a waveguide-based polarization splitter-rotator according to an embodiment of the present invention.

FIG. 1A is a top-view diagram of a waveguide-based polarization splitter-rotator according to an embodiment of the present invention. This diagram is merely an example, which should not unduly limit the scope of the claims. One of ordinary skill in the art would recognize many variations, alternatives, and modifications. Referring to FIG. 1A a top view of waveguide-based polarization splitter-rotator (PSR) 10 is shown. In some embodiments, the PSR 10 includes a converter, a 50:50 splitter 112, a phase shifter, and a 2×2 multimode interference (MMI) coupler 132 that are formed in a monolithically silicon planar waveguide by directly patterning a silicon layer of a silicon-on-insulator (SOI) substrate. In a specific embodiment, a standard platform of the SOI substrate comprises a 220 nm Si layer 112 over an oxide layer 1001, for example as shown as FIG. 1C in cross-sectional view.

In an embodiment, the converter, aiming to provide a desired polarization-mode conversion function for an optical wave inputted via the input port, includes a rib structure waveguide with symmetrically tapered shapes along a lengthwise direction in two segments. The rib structure waveguide is characterized by a top-layer 102 overlying a bottom-layer 101 extended in the lengthwise direction through a first segment of a length $L_1$ from the input port 100 to a joint plane AA' and a second segment of a length $L_2$ from the joint plane to the first cross-section plane 110. The top-layer 102 is narrower than the bottom-layer 101 and both vary throughout the first length $L_1$ and throughout the second length $L_2$ except they have a first common width $W_0$ at the input port 100 and a second common width $W_1$ at the first cross-section plane 110. The specific length-width combination of both the top-layer 102 and the bottom-layer 101 is configured to provide a polarization-mode conversion function for the optical wave transmitted through, depending on wavelength ranges of the optical wave. In particular, it is desired to have a length-width combination of the rib structure waveguide capable of achieving a conversion of Transverse Magnetic (TM0) polarization mode to Transverse Electric (TE0) polarization mode while still maintaining TE0 mode as TE0 mode.

Figure 1B:
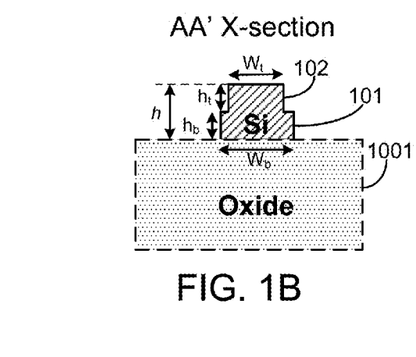
FIG. 1B is a cross-section view along AA' plane of the waveguide-based polarization splitter-rotator of FIG. 1A according to an embodiment of the present invention.

FIG. 1B is a cross-section view along the joint plane AA' of FIG. 1A according to an embodiment of the present invention. Referring to FIG. 1A and FIG. 1B, the rib structure is laid and patterned in a SOI substrate with a standard 220 nm thick silicon layer. The top-layer 102 of a thickness of $h_t$ is formed overlying the bottom-layer 101 of a thickness $h_b$ in an overlay process after the silicon layer of the thickness of $h=h_t+h_b=220$ nm over an oxide layer 1001 is patterned for the rib structure waveguide as part of a monolithic process of forming the PSR 10. In a specific embodiment, the converter is configured for handling optical wave of broadband wavelengths in a range of 1260 nm to 1340 nm of O-band. In addition, the width $W_t$ of the top-layer 102 at the joint plane is made to be greater than the first common width $W_0$, the width $W_b$ of the bottom-layer 101 at the joint plane is made to be greater than the width $W_t$ of the top-layer 102 but smaller than the second common width $W_1$, and the first length $L_1$ is made to be shorter than the second length $L_2$. After fine tuning the length-width combination (with a standard height of 220 nm) under the above configuration the rib structure waveguide serves a desired polarization mode converter. For an input light with mixed TM0 mode and TE0 mode inputted via the input port 100, the TM0 mode is substantially converted to first-order Transverse Electric (TE1) mode and the TE0 mode is substantially converted to zero-order Transverse Electric (TE0) mode as the input light travels to the first cross-section plane 110. Specifically, the TE1 mode includes two sub-modes, an out-of-phase $TE1_1$ sub-mode and an in-phase $TE1_2$ sub-mode. The TE0 mode just is a single phase mode. This conversion function is applicable for all wavelengths in O-band from about 1260 nm to about 1340 nm.

Figure 6:
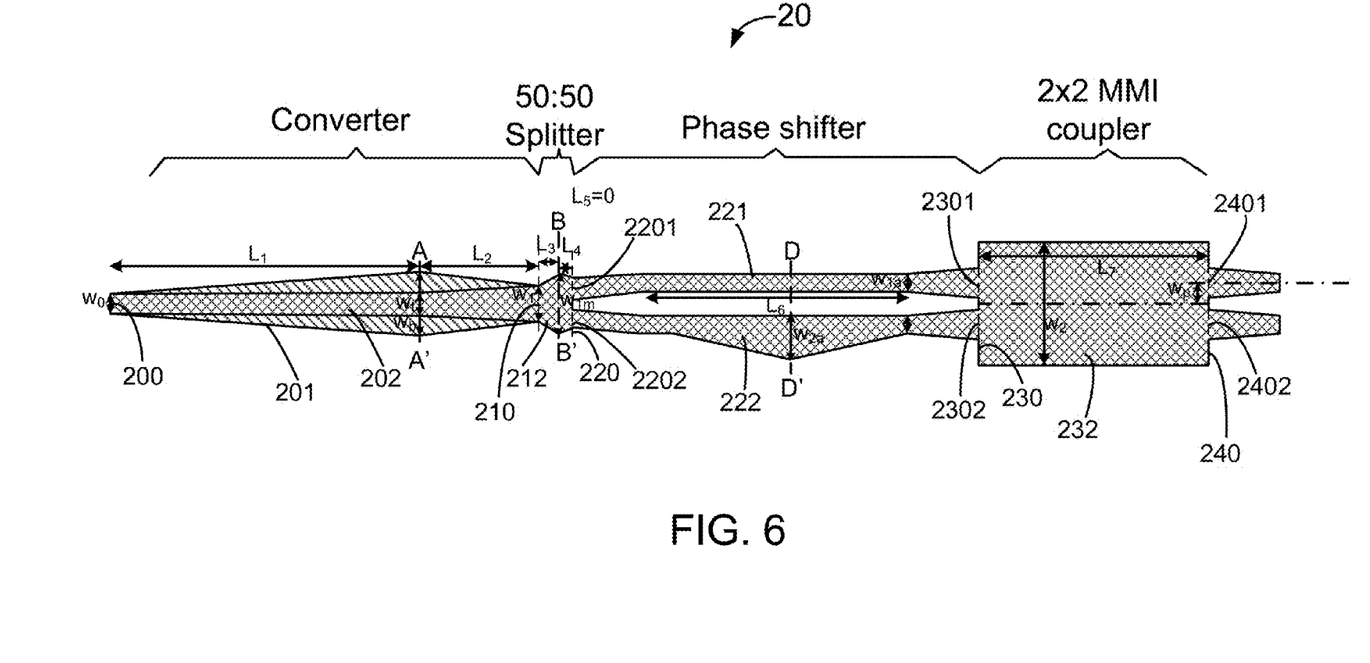
FIG. 6 is a top-view diagram of a waveguide-based polarization splitter-rotator according to another embodiment of the present invention.

The same principle is applicable to design a converter for handling broadband wavelengths in C-band. FIG. 6 is a top-view diagram of a waveguide-based polarization splitter-rotator configured to C-band according to another embodiment of the present invention. Referring to FIG. 6, PSR 20 includes a converter, a 50:50 splitter, a phase shifter, and a 2×2 MMI coupler that are substantially similar in shape and size to those in PSR 10 (of FIG. 1A) and also formed in a monolithically silicon planar waveguide by directly patterning a silicon layer of a silicon-on-insulator (SOI) substrate. The converter of PSR 20 is similarly laid as a rib structure with symmetric tapered shapes characterized by a top-layer 202 overlying a bottom-layer 201 extended in the lengthwise direction through a first segment of a length $L_1$ from the input port 200 to a joint plane AA' and through a second segment of a length $L_2$ from the joint plane to the first cross-section plane 210. The top-layer 202 is narrower than the bottom-layer 201, and both vary throughout the first length $L_1$ and throughout the second length $L_2$ except they have a first common width $W_0$ at the input port 200 and a second common width $W_1$ at the first cross-section plane 210. Yet, due to wavelength difference between C-band and O-band, the converter of the PSR 20 is alternatively configured to make the width $W_t$ of the top-layer 202 at the joint plane to be greater than the first common width $W_0$ but smaller than the second common width $W_1$, the width $W_b$ of the bottom-layer 201 at the joint plane to be greater than the width $W_t$ of the top-layer 202 and the second common width $W_1$, and the first length $L_1$ to be greater than the second length $L_2$. With this length-width combination setup for the rib structure waveguide, the converter is able to convert the TM0 mode of an input light inputted via the input port 200 to first-order TE1 mode at the first cross-section plane 210 and convert the TE0 mode of the input light to zero-order TE0 mode at the first cross-section plane 210, for wavelengths in C-band from about 1525 nm to about 1565 nm.

Figure 1C:
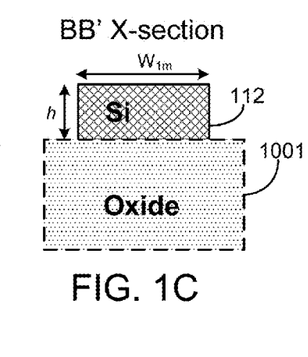
FIG. 1C is a cross-section view along BB' plane of the waveguide-based polarization splitter-rotator of FIG. 1A according to an embodiment of the present invention.

Referring to FIG. 1A, PSR 10 includes a splitter 112 directly coupled to the first cross-section plane of the converter as part of the monolithic planar silicon waveguide formed from the 220 nm silicon layer of the SOI substrate. FIG. 1C is a cross-section view of the waveguide-based PSR 10 along BB' plane according to an embodiment of the present invention. Referring to FIG. 1C and FIG. 1A, the splitter 112 is a planar waveguide having a height h of the 220 nm silicon layer extended in the lengthwise direction from the first cross-section plane 110 to a second cross-section plane 120. The first cross-section plane 110 passes the input light transmitted through the converter. The second cross-section plane 120 includes a first port 1201 and a second port 1202 respectively located next to two opposing edges and separated from each other by a gap $W_g$. In an embodiment, the splitter 112 is designed for splitting the input light received at the first cross-section plane 110 substantially evenly to a first wave at the first port 1201 and a second wave at the second port 1202.

Referring to FIG. 1A and FIG. 1C, for achieving the 50:50 splitting function, the splitter is characterized with symmetrically tapered edges and extended in the lengthwise direction with increasing widths through a length $L_3$ starting from the second common width $W_1$ at the first cross-section plane 110 to a first maximum width $W_{1m}$, then continuously with decreasing widths through a length $L_4$, and further continuously with decreasing widths through additional length $L_5$ ended at the second cross-section plane 120. In an embodiment, 50:50 splitting function can be particularly set to handle a specific range of broadband wavelengths, for example, O-band or C-band. Referring to FIG. 1A, the splitter 112 of PSR 10 is configured to make the length $L_3$ to be smaller than the length $L_4$ and the additional length $L_5$ even smaller than the length $L_3$ with the total length being no greater than 13~14 μm and the first maximum width $W_{1m}$ is no greater than 2.2 μm to handle 50:50 power splitting of input light at all wavelengths in O-band from about 1260 nm to about 1340 nm no matter what is the polarization mode associated with the input light at the first cross-section plane 110 and what are the relative phase differences in different sub-modes therein. In particular, the splitter 112 with the above length-width combination is configured to split the input light with the single-phase zero-order TE0 mode at the first cross-section plane 110 to two waves with in-phase TE0 sub-modes at the second cross-section plane 120: a first wave with $TE0_1$ sub-mode is guided to the first port 1201 and a second wave with $TE0_2$ sub-mode is guided to the second port 1202. At the same time, the same splitter 112 is configured to split the input light with the first-order TE1 mode at the first cross-section plane 110 to two waves, a first wave with the out-of-phase $TE1_1$ sub-mode and a second wave with the in-phase $TE1_2$ sub-mode respectively at the first port 1201 and the second port 1202 of the second cross-section plane 120. Since the out-of-phase $TE1_1$ sub-mode and the in-phase $TE1_2$ sub-mode inherently have a phase difference of π, the general interference effect within the splitter 112 is just able to separate the two TE1 sub-modes spatially while maintaining corresponding phases. In particular, the $TE1_1$ sub-mode is in the first wave guided to the first port 1201 and the $TE1_2$ sub-mode is in the second wave guided to the second port 1202, while the $TE1_1$ sub-mode retains its phase delay of π relative to the $TE1_2$ sub-mode, for all wavelengths in O-band from about 1260 nm to about 1340 nm. Note, the gap Wg between the first port 1201 and the second port 1202 is kept to be no smaller than 0.2 μm to ensure that the waveguide patterning process is practically within its tolerance range of process variation.

In a specific embodiment, the length-width combination of the splitter waveguide must be reconfigured to allow the splitter to handle alternative broadband of wavelengths. Referring to FIG. 6, under the same principle yet with reconfigured length-width combination, the splitter 212 of PSR 20, which has substantially similar shape and same height h of 220 nm as the splitter 112, is able to handling 50:50 splitting of input light of any polarization mode with a broadband of wavelengths in C-band. In particular, the length $L_3$ is made to be greater than the length $L_4$ and yet the length $L_5$ is set to be zero with total length being set no greater than 2 μm and the first maximum width $W_{1m}$ at the joint plane connecting the length $L_3$ to the length $L_4$ being set no greater than 1.5 μm. Under such configuration, the splitter 212 of PSR 20 is operated to split the input light at any wavelength in C-band from about 1525 nm to about 1565 nm provided at a first cross-section plane 210 to a first wave to the first port 2201 and a second wave to the second port 2202 at a second cross-section plane 220. The polarization mode of each of the first wave and the second wave as well as their relative phase difference are handled the same way as the splitter 112 of PSR 10.

Referring to FIG. 1A again, the PSR 10 includes a phase shifter waveguide coupled to or naturally extended from the first port 1201 and the second port 1202 at the second middle cross-section plane 120. The phase shifter waveguide includes a first waveguide arm 121 coupled to the first port 1201 and a second waveguide arm 122 coupled to the second port 1202, both having the same height h of the 220 nm silicon layer. The first waveguide arm 121 is extended in the lengthwise direction to a third port 1301 of a third cross-section plane 130 and the second waveguide arm 122 is separately extended in the lengthwise direction to a fourth port 1302 of the third cross-section plane 130. In an embodiment, the first waveguide arm 121 is configured to receive the first wave from the first port 1201 and to transmit the first wave through at least a length $L_6$ towards the third port 1301 while keeping the first wave at the third port 1301 in-phase relative to that at the first port 1201. The second waveguide arm 122 is configured to receive the second wave from the second port 1202 and to transmit the second wave through a separate path of the same length $L_6$ towards the fourth port 1302 while adding a phase shift to the second wave at the fourth port 1302 relative to that at the second port 1202.

Figure 1D:
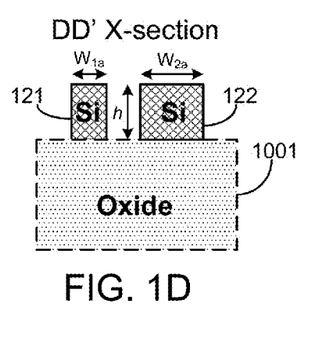
FIG. 1D is a cross-section view along CC' plane of the waveguide-based polarization splitter-rotator of FIG. 1A according to an embodiment of the present invention.

FIG. 1D is a cross-section view of the waveguide-based PSR 10 along CC' plane according to an embodiment of the present invention. Referring to FIG. 1A and FIG. 1D, the first waveguide arm 121 of the phase shifter includes a straight bar shape of at least the length $L_6$ and a first arm width $W_{1a}$ connected between the first port 1201 and the third port 1301, and the second waveguide arm 122 of the phase shifter includes a straight bar shaped portion having at least the length $L_6$ joined aside with a triangle shaped portion connected between the second port 1202 and the fourth port 1302. The second waveguide arm 122 has a varying second arm width $W_{2a}$ which increases from the first arm width $W_{1a}$ at one end to a maximum at an apex of the triangle shaped portion then decreasing again to the first arm width $W_{1a}$ at the other end. The constant width $W_{1a}$ associated with the length $L_6$ in the first waveguide arm 121 effectively retains first wave in-phase travelling through the first waveguide arm 121 to reach the third port 1301 at the third cross-section plane 130. At the same time, the varying width $W_{2a}$ associated with the length $L_6$ in the second waveguide arm 122 can be adjusted to provide a desired phase delay to the second wave traveling independently through the second waveguide arm 122 to reach the fourth port 1302 at the third cross-section plane 130. In a specific configuration, the maximum $W_{2a}$ is set to be slightly smaller than twice of the first arm width $W_{1a}$ and the length $L_6$ is no greater than 11 μm to cause a phase delay of $(1/2)\pi$ in the second wave through the second waveguide arm 122. Alternatively, with lightly reduction in the maximum $W_{2a}$ and increase in the length $L_6$, a phase delay of $(3/2)\pi$ can be produced to the second wave through the second waveguide arm 122. In principle, a phase shift of $(\pi/2+n\pi)$ can be generated for n being any integer though effective phase values are all limited within $2\pi$. Despite other phase delay values can be produced, the above two phase delays are directly utilized in the PSR 10 (FIG. 1A) and PSR 20 (FIG. 6) of the present disclosure for handling light with wavelengths in both O-band and C-band.

Referring to FIG. 1A again, the PSR 10 includes a 2×2 MMI coupler 132 as a planar waveguide of the same height h of 220 nm silicon layer naturally extended from the third port 1301 and the fourth port 1302 at the third cross-section plane 130 to an output plane 140 with a first output port 1401 and a second output port 1402. From the input port 100 to the fourth cross-section plane 140, the PSR 10 includes a total length less than 100 µm, thus forming a very compact sized device suitable for highly integrated silicon photonics communication system. The 2×2 MMI coupler 132 is characterized by a rectangular shape of a length $L_7$ measured from the third cross-section plane 130 to the output plane 140 and a width $W_2$. The first output port 1401 is aligned with the third port 1301 in a bar position at a distance $W_p$ away from a central line of the rectangular shaped planar waveguide in the lengthwise direction. The first output port 1401 is in a cross position relative to the fourth port 1302. The second output port 1402 and the fourth port 1302 are respectively in mirror symmetric positions relative to the first output port 1401 and the third port 1301, nevertheless making the second output port 1402 to be in a cross-position relative to the third port 1301. The 2×2 MMI coupler 132 in such configuration induces a general interference of optical waves coupled via both the third port 1301 and the fourth port 1302 and outputs a first output light in TE0 mode to the first output port 1401 and a second output light in TE0 mode to the second output port 1402. Depending on specific polarization modes and phase difference of the first wave at the third port 1301 and the second wave at the fourth port 1302, optionally, the first output light may be exclusively originated from the input light with TM0 mode and the second output light may be exclusively originated from the input light with TE0 mode. In other words, the PSR 10 is able to split the input light with mixed TM0 mode and TE0 mode to guide one part substantially exclusively with a TM0 mode and rotate it to a TE0 mode and guide another part substantially exclusively with a TE0 mode and retain it as a TE0 mode, and respectively to output the two parts separately to two output ports.

Alternatively, referring to FIG. 6, the PSR 20 includes a substantially similar 2×2 MMI coupler 232 as a planar waveguide of the same height h of 220 nm silicon layer naturally extended from the third port 2301 and the fourth port 2302 at the third cross-section plane 230 to an output plane 240 with a first output port 2401 and a second output port 2402. The PSR 20 is specifically configured to handling light wave polarization mode splitting and rotating for wavelengths in C-band, e.g., about 1525 nm to about 1565 nm. From the input port 200 to the fourth cross-section plane 240, the PSR 20 includes a total length that can be limited within 50 µm, forming a ultra-compact sized device suitable for highly integrated silicon photonics communication system.

Figure 2:
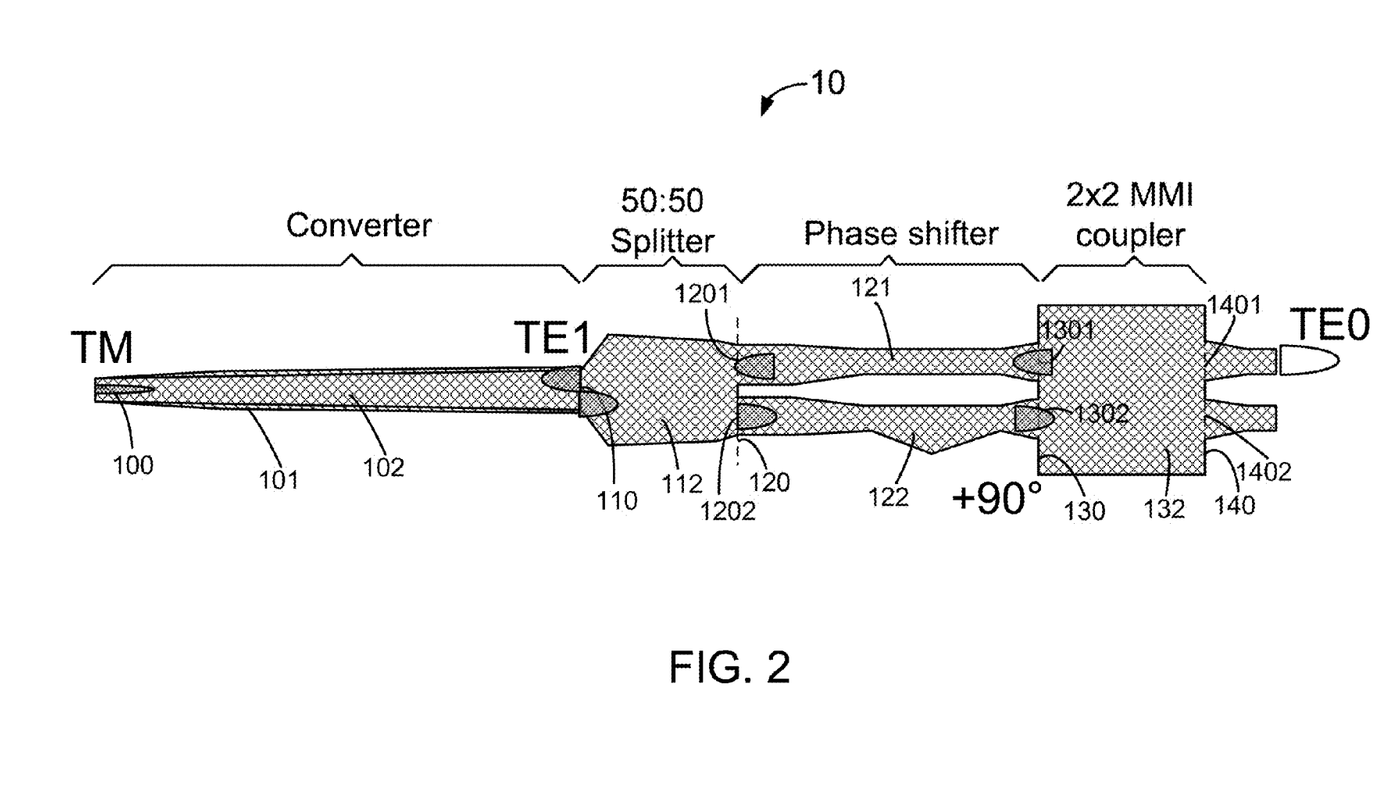
FIG. 2 is a schematic diagram showing functions of the polarization splitter-rotator for handling an input light in TM0 mode and generating an output light in TE0 mode to one output port according to an embodiment of the present invention.

FIG. 2 is a schematic diagram showing functions of the polarization splitter-rotator for handling an input light in TM0 mode and generating an output light in TE0 mode to one output port according to an embodiment of the present invention. This diagram is merely an example, which should not unduly limit the scope of the claims. One of ordinary skill in the art would recognize many variations, alternatives, and modifications. In an embodiment, the polarization splitter-rotator is PSR 10 of FIG. 1A as disclosed earlier in the specification. Referring to FIG. 2, the TM0 mode of the input light, depicted by a narrow waveform (though its polarization is along a direction perpendicular to a top surface of the PSR 10), is inputted via the input port 100. The converter with a rib-structure having a narrower top-layer 102 over a wider bottom layer 101 is configured to convert the TM0 mode to first-order TE1 mode at the first cross section 110. The TE1 mode includes a 180-degree out-of-phase sub-mode (with a phase delay of $\pi$) depicted by a backward waveform and an in-phase sub-mode depicted by a forward waveform. Further the splitter 112 is configured to couple to the first cross-section plane 110 to receive the input light with TE1 mode and split the input light substantially evenly to a first wave at the first port 1201 and a second wave at the second port 1202 both at the second cross-section plane 120. In particular, the first wave bears substantially the out-of-phase TE1 sub-mode and the second wave bears substantially the in-phase TE1 sub-mode, the out-of-phase TE1 sub-mode has a phase delay of $\pi$ relative to the in-phase TE1 sub-mode.

Referring to FIG. 2, in addition, the phase shifter having a first waveguide arm 121 coupled to the first port 1201 and the second waveguide arm 122 coupled to the second port 1202 to respectively handling the first wave and the second wave. The first wave travels through the first waveguide arm 121 to reach the third port 1301, substantially keeping the same TE1 sub-mode in the same phase, i.e., the 180-degree out-of-phase TE1 sub-mode, and the second wave travels through the second waveguide arm 122 to reach the fourth port 1302 with a phase shift of +90 degrees, making a phase difference of 270 degrees between the first wave and the second wave. In other words, the first wave bearing a TE1 sub-mode with $(3/2)\pi$ phase delay relative to the second wave bearing a TE1 sub-mode.

Further referring to the FIG. 2, the 2×2 MMI coupler 132 is configured to induce general interference of the first wave bearing TE1 sub-mode and the second wave bearing TE1 sub-mode respectively received via the third port 1301 and the fourth port 1302 with a phase difference of 270 degrees and to generate an output light bearing a TE0 mode substantially exclusively at the first output port 1401.

Figure 3:
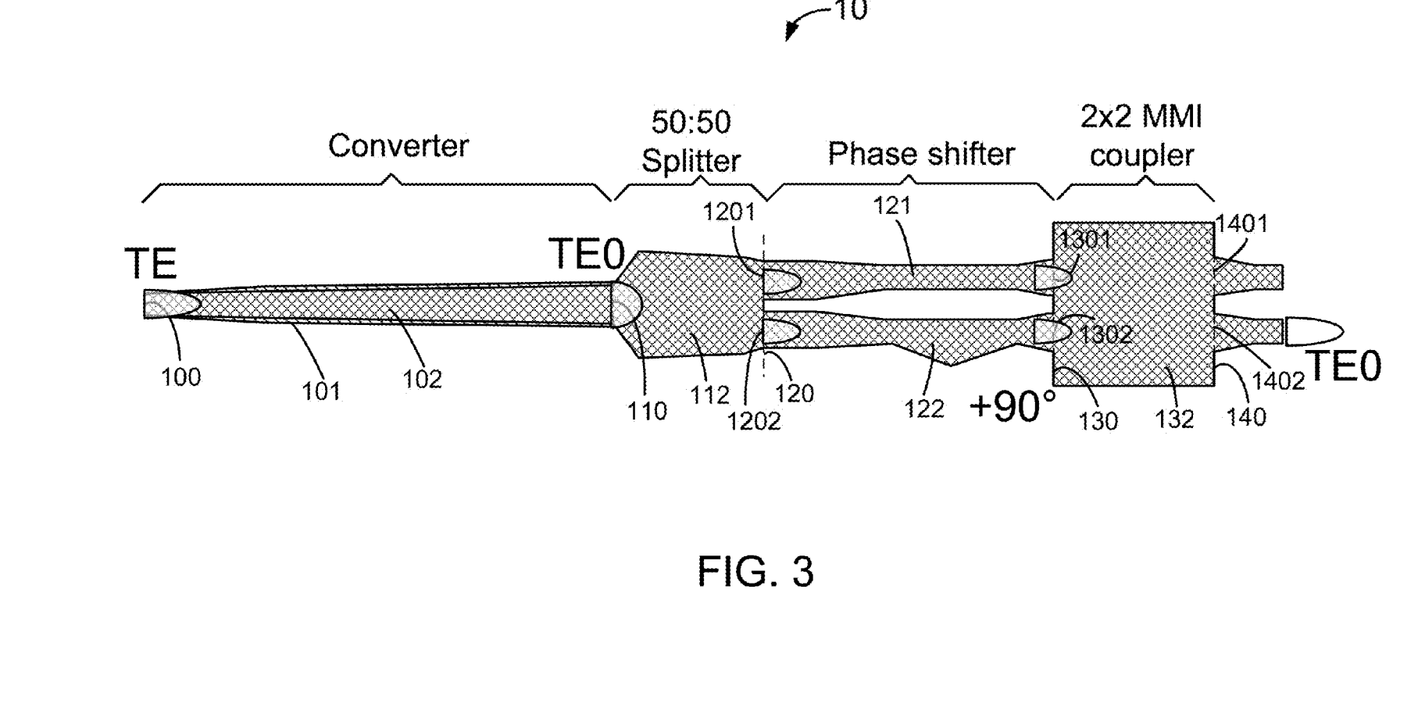
FIG. 3 is a schematic diagram showing functions of the polarization splitter-rotator for handling an input light in TE0 mode and generating an output light in TE0 mode to a separate output port according to an embodiment of the present invention.

FIG. 3 is a schematic diagram showing functions of the polarization splitter-rotator for handling an input light in TE0 mode and generating an output light in TE0 mode to a separate output port according to an embodiment of the present invention. This diagram is merely an example, which should not unduly limit the scope of the claims. One of ordinary skill in the art would recognize many variations, alternatives, and modifications. In an embodiment, the polarization splitter-rotator is PSR 10 of FIG. 1A as disclosed earlier in the specification. As shown, an input light with TE0 mode is inputted via the input port 100 into the PSR 10. The converter retains substantially zero-order TE0 mode at the first cross-section plane 110. Then, the splitter 112 splits the input light substantially evenly to a first wave at the first port 1201 and a second wave at the second port 1202 both bearing a TE0 sub-mode at the second cross-section plane 120. The phase shifter then performs its function the same way as above, i.e., retaining the polarization mode and phase of the first wave at the third port 1301 after traveling through the first waveguide arm 121 and adding a phase shift of 90 degrees to the second wave at the fourth port 1302 after traveling through the second waveguide arm 122. Thus, a phase difference of 90 degrees exists between the first wave bearing TE0 sub-mode at the third port 1301 and the second wave bearing TE0 sub-mode at the fourth port 1302. The 2×2 MMI coupler 132 is configured to induce general interference of the first wave bearing TE0 sub-mode and the second wave bearing TE0 sub-mode respectively received via the third port 1301 and the fourth port 1302 with a phase difference of 90 degrees, thereby generating an output light bearing a TE0 mode substantially exclusively at the second output port 1402.

Figures 4A, 4B:
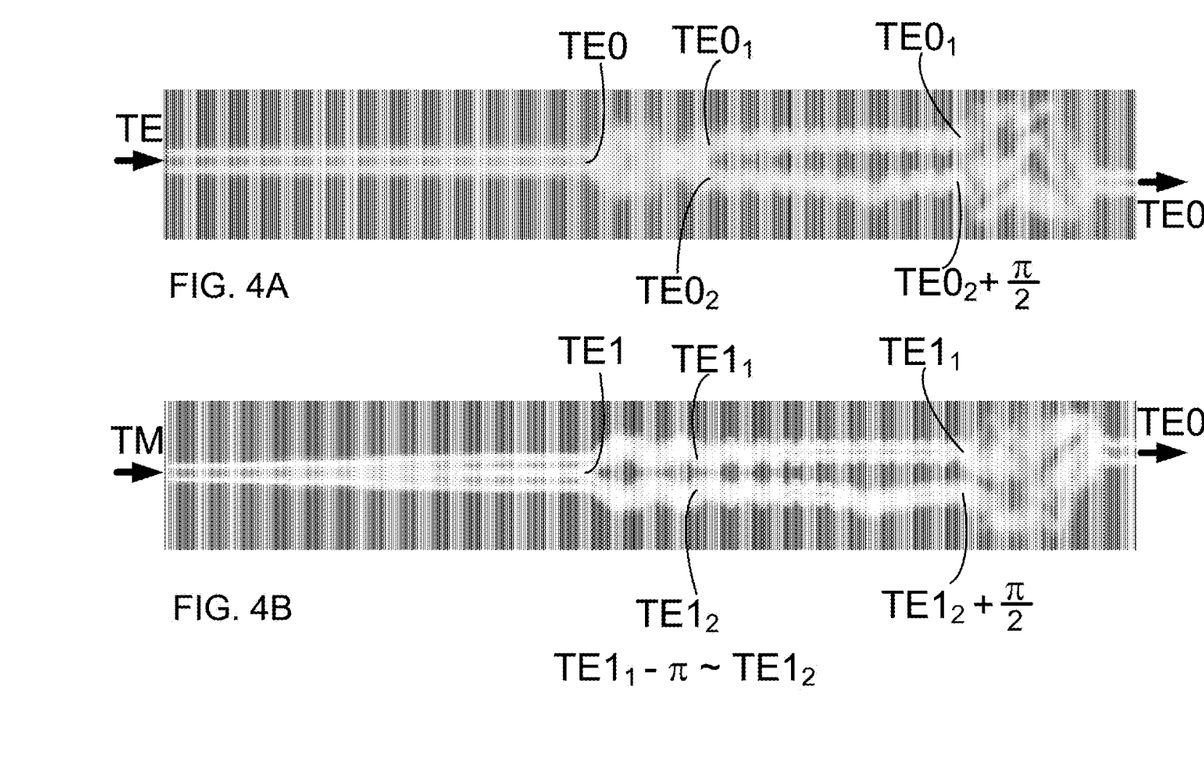
FIGS. 4A and 4B are an exemplary diagram showing intensity distributions of an input light in TM0 mode passing forward through a polarization splitter-rotator to one of two output ports as an output light in TE0 mode and an exemplary diagram showing intensity distributions of an input light in TE0 mode passing forward through the polarization splitter-rotator to another output light in TE0 mode, respectively, according to an embodiment of the present invention.

FIGS. 4A and 4B are an exemplary diagram showing intensity distributions of an input light in TM0 mode passing forward through a polarization splitter-rotator to one of two output ports as an output light in TE0 mode and an exemplary diagram showing intensity distributions of an input light in TE0 mode passing forward through the polarization splitter-rotator to another output light in TE0 mode, respectively, according to an embodiment of the present invention. In an embodiment, the polarization splitter-rotator is PSR 10 of FIG. 1A as a monolithically formed planar waveguide disclosed earlier in the specification. As shown in FIG. 4A, the PSR receives a TE0 mode light wave and firstly couples it to a zero-order TE0 mode light wave. Secondly, the PSR splits the zero-order TE0 mode light wave to a first wave with $TE0_1$ sub-mode to an upper waveguide branch and a second wave with $TE0_2$ sub-mode to a lower waveguide branch. Both the first wave and the second wave are in-phase to each other. Further down the paths, the PSR is configured to retain the phase of the first wave with $TE0_1$ sub-mode at an end of the upper waveguide branch and to add 90 degrees phase shift to the second wave with $TE0_2$ sub-mode at an end of the lower waveguide branch. Lastly, the PSR couples the first wave and the second wave with added 90 degrees phase shift to induce a spatial interference distribution and generate an output wave with TE0 mode substantially exclusively to one output port to complete a TE path. Optionally, depending on the phase difference value of 90 degrees (or $\pi/2$) between the first wave and the second wave and their polarization modes (TE0), the one output port is one at a lower position as shown in FIG. 4A and the TE path of the PSR 10 is from the input port 100 to the second output port 1402 of FIG. 1A.

Figure 7A:
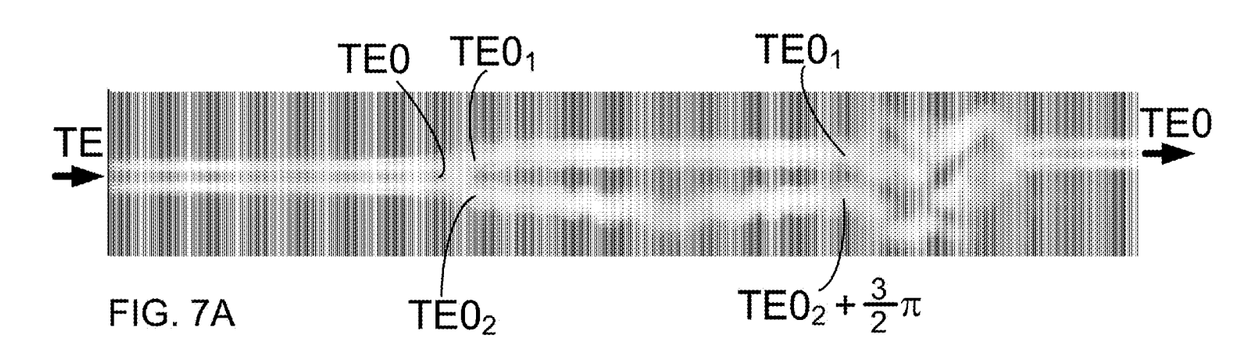
FIGS. 7A and 7B are an exemplary diagram showing intensity distributions of an input light in TM0 mode passing forward through a polarization splitter-rotator to one of two output ports as an output light in TE0 mode and an exemplary diagram showing intensity distributions of an input light in TE0 mode passing forward through the polarization splitter-rotator to another output light in TE0 mode according to another embodiment of the present invention.

Alternatively, as shown in FIG. 7A for the PSR 20 of FIG. 6, the PSR is configured to retain the phase of the first wave with $TE0_1$ sub-mode at an end of the upper waveguide branch and adds 270 degrees phase shift to the second wave with $TE0_2$ sub-mode at an end of the lower waveguide branch. Then, the PSR couples the first wave with $TE0_1$ sub-mode and the second wave with $TE0_2$ sub-mode and added 270 degrees phase shift to induce a spatial interference distribution and generate an output wave with TE0 mode substantially exclusively to the first output port. The TE path of the PSR 20 in this case is from the input port 200 to the first output port 2401 of FIG. 6.

Referring to FIG. 4B, the PSR receives a TM0 mode light wave and firstly couples it to a first-order TE1 mode light wave. Secondly, the PSR splits the first-order TE1 mode light wave to a first wave with $TE1_1$ sub-mode to an upper waveguide branch and a second wave with $TE1_2$ sub-mode to a lower waveguide branch. The first wave with $TE1_1$ sub-mode has a phase delay of 180 degrees ($\pi$) relative to the second wave $TE1_2$ sub-mode. Further down the paths, the PSR retains the phase of the first wave with $TE1_1$ sub-mode at an end of the upper waveguide branch and adds 90 degrees phase shift to the second wave with $TE1_2$ sub-mode at an end of the lower waveguide branch. Thus, the first wave with $TE1_1$ sub-mode now has a phase delay of 270 degrees relative to the second wave with $TE1_2$ sub-mode. Lastly, the PSR couples the first wave with $TE1_1$ sub-mode and the second wave with $TE1_2$ sub-mode and 270 degrees ($3\pi/2$) phase difference to induce a spatial interference distribution and generate an output wave with TE0 mode substantially exclusively to one output port to complete a TM path. Optionally, depending on the phase difference value of 270 degrees (or $3\pi/2$) between the first wave and the second wave and their polarization modes (TE1), the output port is one at an upper position as shown in FIG. 4B and the TM path of the PSR is from the input port to the first output port of FIG. 1A.

Figure 7B:
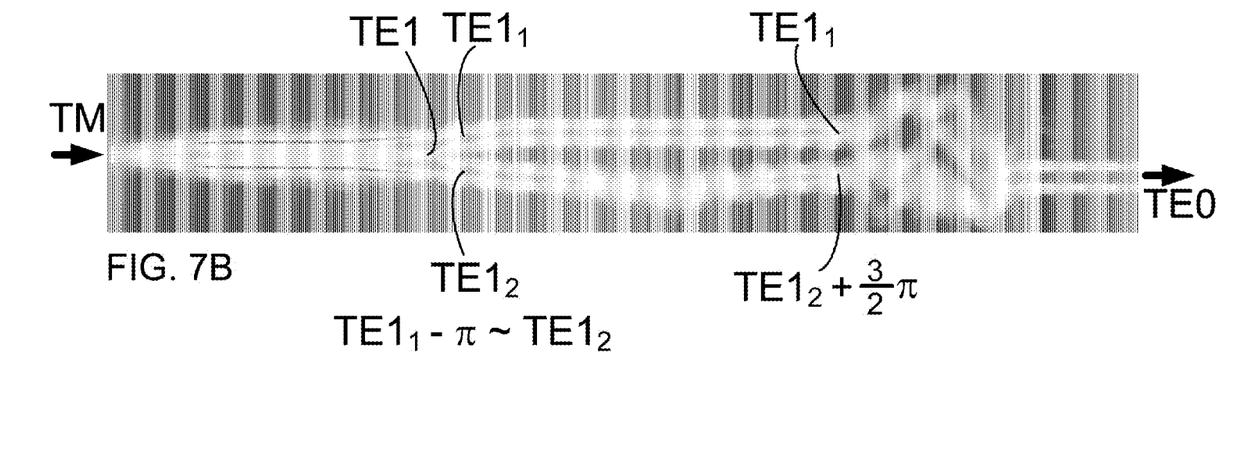

Alternatively, as shown in FIG. 7B for PSR 20 of FIG. 6, the PSR is configured to retain the phase of the first wave with $TE1_1$ sub-mode at an end of the upper waveguide branch and adds 270 degrees phase shift to the second wave with $TE1_2$ sub-mode at an end of the lower waveguide branch. Then, the second wave effectively has a total phase shift of 180+270 degrees, or effectively 90 degrees phase difference, relative to the first wave. Lastly, the PSR couples the first wave with $TE1_1$ sub-mode and the second wave with $TE1_2$ sub-mode and 90 degrees ($\pi/2$) phase difference to induce a spatial interference distribution and generate an output wave with TE0 mode substantially exclusively to the second output port. The TM path of the PSR 20 in this case is from the input port 200 to the second output port 2402 of FIG. 6. Nevertheless, the TM path of the PSR is substantially exclusive to the TE path of the PSR. Therefore, the input light with mixed TM0 mode and TE0 mode is exclusively split apart and the TM0 mode of the input light is also rotated to TE0 mode by the PSR of the present disclosure.

In an embodiment, the PSR of the present disclosure under a single fixed configuration separate TM0 mode from the TE0 mode of a light wave and converts the TM0 mode also to TE0 mode substantially insensitive to a broad range of wavelengths, either an O-band or a C-band, which is a desirable feature required for many applications of polarization-independent optical communications.

Figure 5:
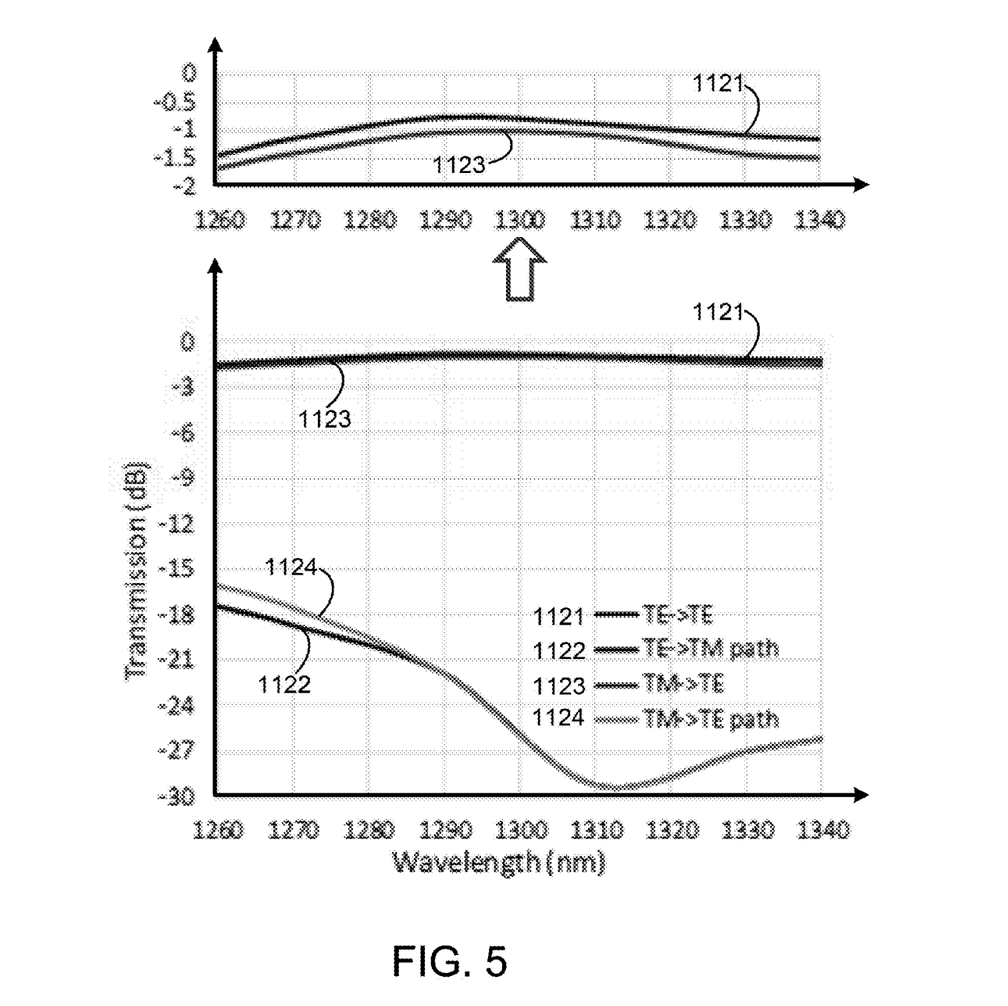
FIG. 5 is a plot of transmission losses of the polarization splitter-rotator versus O-band wavelengths according to an embodiment of the present invention.

FIG. 5 is a plot of transmission losses of the polarization splitter-rotator versus O-band wavelengths according to an embodiment of the present invention. This diagram is merely an example, which should not unduly limit the scope of the claims. One of ordinary skill in the art would recognize many variations, alternatives, and modifications. In an embodiment, the polarization splitter-rotator is the PSR 10 disclosed above and used for handling a light wave with any wavelengths in O-band from about 1260 nm to about 1340 nm. As shown, curve 1121 shows a result of a transmission loss variation of the light wave in TE0 mode over the O-band wavelengths passing the PSR 10 with retained TE0 mode (TE0→TE0) through the TE path and curve 1123 shows a result of a transmission loss variation of the light wave in TM0 mode over the O-band wavelengths passing the PSR 10 with converted TE0 mode (TM0→TE0) through the TM path. Both plots are further shown in an expanded y-axis scale (in upper portion of the figure). The transmission loss for TE0 mode light through TE path is less than 1.1 dB with about 0.4 dB variation across entire range of wavelengths shown. The transmission loss for TM0 light through TM path is less than 1.7 dB with about 0.7 dB variation across the same range of wavelengths. It demonstrates that PSR 10 of the present disclosure has high performance property to split and rotate TM0 mode and TE0 mode of the O-band light with very low insertion loss.

In addition, PSR 10 of the present disclosure also is characterized by a high extinction ratio for splitting the TM0 mode and the TE0 mode. Referring to FIG. 5, curve 1122 shows a result of power loss of greater than 17 dB for light with TE0 mode leaking through the TM path of the PSR 10 and curve 1124 shows a result of power loss of greater than 16 dB for light with TM0 mode leaking through the TE path of the PSR 10.

Figure 8:
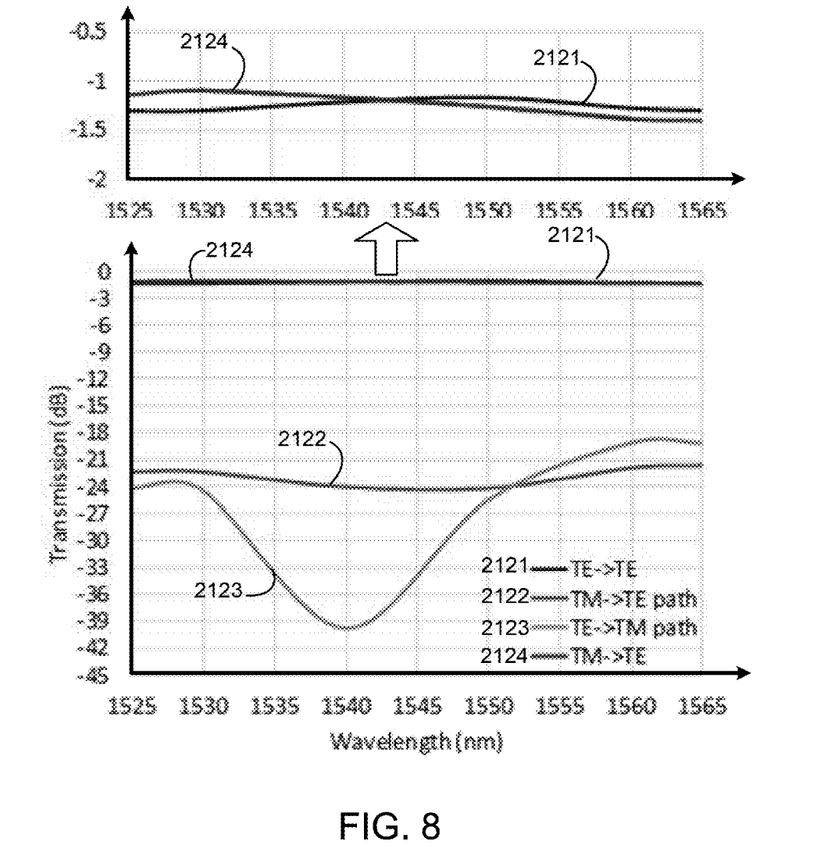
FIG. 8 is a plot of transmission losses of the polarization splitter-rotator versus C-band wavelengths according to an embodiment of the present invention.

FIG. 8 is a plot of transmission losses of the polarization splitter-rotator versus C-band wavelengths according to an embodiment of the present invention. This diagram is merely an example, which should not unduly limit the scope of the claims. One of ordinary skill in the art would recognize many variations, alternatives, and modifications. In an embodiment, the polarization splitter-rotator is the PSR 20 disclosed above and used for handling a light wave with any wavelengths in C-band from about 1525 nm to about 1565 nm. As shown, curve 2121 shows a result of a transmission loss variation of the light wave in TE0 mode over the C-band wavelengths passing the PSR 20 with retained TE0 mode (TE0→TE0) through the TE path and curve 2124 shows a result of a transmission loss variation of the light wave in TM0 mode over the C-band wavelengths passing the PSR 20 with converted TE0 mode (TM0→TE0) through the TM path. Both plots are further shown in an expanded y-axis scale (in upper portion of the figure). The transmission loss for TE0 mode light through the TE path is less than 1.3 dB with about 0.2 dB variation across entire range of wavelengths shown. The transmission loss for TM0 light through TM path is less than 1.4 dB with about 0.3 dB variation across the same range of wavelengths. It demonstrates that PSR 20 of the present disclosure has high performance property to split and rotate TM0 mode and TE0 mode of the C-band light with very low insertion loss.

In addition, PSR 20 of the present disclosure also is characterized by a high extinction ratio for splitting the TM0 mode and the TE0 mode. Referring to FIG. 8, curve 2122 shows a result of power loss of greater than 21 dB for light with TE0 mode leaking through the TM path of the PSR 20 and curve 2123 shows a result of power loss of greater than 19 dB for light with TM0 mode leaking through the TE path of the PSR 20.

Accordingly, the present invention provides, inter alia, a waveguide-based polarization splitter-rotator, a polarization-independent device for integrating polarization-division devices with polarization-independent silicon photonics communication system using a SOI substrate with standard 220 nm silicon layer that substantially obviate one or more of the problems due to limitations and disadvantages of the related art. In one aspect, the present invention provides an integrated silicon-photonics polarization-division transceiver comprising a polarization splitter-rotator in either its transmitter output path or receiver input path to handling light wave of wavelengths in certain range of O-band. Each polarization splitter-rotator includes a converter waveguide having a rib structure with symmetrically tapered shapes extended in a lengthwise direction from an input port to a first cross-section plane. The converter waveguide is configured to guide an input light with mixed Transverse Magnetic (TM0) polarization mode and Transverse Electric (TE0) polarization mode from the input port to the first cross-section plane with the TM0 mode being converted to a first order Transverse Electric (TE1) mode and the TE0 mode being converted to a zero order TE0 mode. Further, the polarization splitter-rotator includes a splitter comprising a planar waveguide extended further in the lengthwise direction from the first cross-section plane to a second cross-section plane having a first port and a second port separated from each other. The splitter is configured to split the input light substantially evenly in power to a first wave at the first port and a second wave at the second port. Additionally, the polarization splitter-rotator includes a phase-shifter comprising a first waveguide arm coupled to the first port and a second waveguide arm coupled to the second port. The first waveguide arm is extended in the lengthwise direction from the first port to a third port of a third cross-section plane and configured to keep the first wave at the third port in-phase relative to that at the first port. The second waveguide arm is separately extended in the lengthwise direction from the second port to a fourth port of the third cross-section plane and configured to add a phase shift of $(1/2)\pi$ to the second wave at the fourth port relative to that at the second port. Furthermore, the polarization splitter-rotator includes a 2×2 Multimode Interference (MMI) coupler extended further in the lengthwise direction from the third cross-section plane to an output plane having a first output port and a second output port disposed respectively in bar position relative to the third port and the fourth port. The 2×2 MMI coupler is configured to separately output a first output light in TE0 mode substantially originated from the input light in TE0 mode and a second output light in TE0 mode substantially originated from the input light in TM0 mode. Optionally, the first output light in TE0 mode just suffers a transmission loss less than 1.7 dB relative to the input light in TM0 mode with wavelengths in a broad range of 1260 nm-1340 nm and the second output light in TE0 mode merely suffers a transmission loss less than 1.5 dB relative to the input light in TE0 mode with wavelengths in the same range of 1260 nm-1340 nm. The first output light and the second output light are respectively outputted via the first output port and the second output port with an extinction ratio no smaller than 16 dB.

In another aspect, the present invention provides an integrated silicon-photonics polarization-division transceiver comprising a polarization splitter-rotator in either its transmitter output path or receiver input path to handling light wave of wavelengths in certain range of C-band. Each polarization splitter-rotator includes a converter waveguide having a rib structure with symmetrically tapered shapes extended in a lengthwise direction from an input port to a first cross-section plane. The converter waveguide is configured to guide an input light with mixed Transverse Magnetic (TM0) polarization mode and Transverse Electric (TE0) polarization mode from the input port to the first cross-section plane with the TM0 mode being converted to a first order Transverse Electric (TE1) mode and the TE0 mode being converted to a zero order TE0 mode. Further, the polarization splitter-rotator includes a splitter comprising a planar waveguide extended further in the lengthwise direction from the first cross-section plane to a second cross-section plane having a first port and a second port separated from each other. The splitter is configured to split the input light substantially evenly in power to a first wave at the first port and a second wave at the second port. Additionally, the polarization splitter-rotator includes a phase-shifter comprising a first waveguide arm coupled to the first port and a second waveguide arm coupled to the second port. The first waveguide arm is extended in the lengthwise direction from the first port to a third port of a third cross-section plane and configured to keep the first wave at the third port in-phase relative to that at the first port. The second waveguide arm is separately extended in the lengthwise direction from the second port to a fourth port of the third cross-section plane and configured to add a phase shift of $(3/2)\pi$ to the second wave at the fourth port relative to that at the second port. Furthermore, the polarization splitter-rotator includes a 2×2 Multimode Interference (MMI) coupler extended further in the lengthwise direction from the third cross-section plane to an output plane having a first output port and a second output port disposed respectively in bar position relative to the third port and the fourth port. The 2×2 MMI coupler is configured to separately output a first output light in TE0 mode substantially originated from the input light in TE0 mode and a second output light in TE0 mode substantially originated from the input light in TM0 mode. Optionally, the first output light in TE0 mode just suffers a transmission loss less than 1.3 dB relative to the input light in TE0 mode with wavelengths in a range of 1525 nm-1565 nm and the second output light in TE0 mode just suffers a transmission loss less than 1.4 dB relative to the input light in TM0 mode with wavelengths in the same range of 1525 nm-1565 nm. The first output light and the second output light are respectively outputted via the second output port and the first output port with an extinction ratio no smaller than 19 dB.

In yet another aspect, the present disclosure additionally provides a polarization-independent silicon photonics communication system comprising an integrated polarization-division transceiver coupled to a polarization splitter-rotator in either a transmitter output path or a receiver input path. The polarization splitter-rotator includes a converter comprising a rib structure waveguide with symmetrically tapered shapes extended in a lengthwise direction from an input port to a first cross-section plane. The converter is configured to guide an input light with mixed Transverse Magnetic (TM0) polarization mode and Transverse Electric (TE0) polarization mode from the input port to the first cross-section plane with the TM0 mode being coupled to a first order Transverse Electric (TE1) mode and the TE0 mode being coupled to a zero order TE0 mode. Further, the polarization splitter-rotator includes a splitter comprising a planar waveguide extended further in the lengthwise direction from the first cross-section plane to a second cross-section plane having a first port and a second port separated from each other. The splitter is configured to split the input light substantially evenly in power to a first wave at the first port and a second wave at the second port. Additionally, the polarization splitter-rotator includes a phase-shifter comprising a first waveguide arm coupled to the first port and a second waveguide arm coupled to the second port. The first waveguide arm is extended in the lengthwise direction from the first port to a third port of a third cross-section plane and configured to keep the first wave at the third port in-phase relative to that at the first port. The second waveguide arm is separately extended in the lengthwise direction from the second port to a fourth port of the third cross-section plane and configured to add a phase shift to the second wave at the fourth port relative to that at the second port. Furthermore, the polarization splitter-rotator includes a 2×2 Multimode Interference (MMI) coupler extended further in the lengthwise direction from the third cross-section plane to an output plane having a first output port and a second output port disposed respectively in bar position relative to the third port and the fourth port, and configured to separately output a first output light in TE0 mode substantially originated from the input light in TE0 mode and a second output light in TE0 mode substantially originated from the input light in TM0 mode. Optionally, as the second waveguide arm of the phase shifter is configured to add $(1/2)\pi$ to the second wave, the first output light in TE0 mode suffers a transmission loss less than 1.7 dB relative to the input light in TM0 mode for a broad O-band wavelengths between 1260 nm and 1340 nm or C-band wavelengths between 1525 nm and 1565 nm, and the second output light in TE0 mode also just suffers less than 1.7 dB insertion loss relative to input light in TE0 mode. Alternatively, as the second waveguide arm of the phase shifter is configured to add $(3/2)\pi$ to the second wave, the first output light in TE0 mode suffers a transmission loss less than 1.7 dB relative to the input light in TE0 mode for a broad O-band wavelengths between 1260 nm and 1340 nm or C-band wavelengths between 1525 nm and 1565 nm, and the second output light in TE0 mode also just suffers less than 1.7 dB insertion loss relative to input light in TM0 mode. The first output port and the second output port are associated with an extinction ratio no smaller than 16 dB for TE-to-TE split-conversion versus TM-to-TE split-conversion.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A polarization splitter-rotator for broadband operation comprising:

a converter comprising a rib structure waveguide with symmetrically tapered shapes extended in a lengthwise direction from an input port to a first cross-section plane, the converter being configured to guide an input light with mixed Transverse Magnetic (TM0) polarization mode and Transverse Electric (TE0) polarization mode from the input port to the first cross-section plane with the TM0 mode being coupled to a first order Transverse Electric (TE1) mode and the TE0 mode being coupled to a zero order TE0 mode;

a splitter comprising a planar waveguide extended further in the lengthwise direction from the first cross-section plane to a second cross-section plane having a first port and a second port separated from each other, and configured to split the input light substantially evenly in power to a first wave at the first port and a second wave at the second port;

a phase-shifter comprising a first waveguide arm coupled to the first port and a second waveguide arm coupled to the second port, the first waveguide arm being extended in the lengthwise direction to a third port of a third cross-section plane and configured to keep the first wave at the third port in-phase relative to that at the first port, the second waveguide arm being separately extended in the lengthwise direction to a fourth port of the third cross-section plane and configured to add a phase shift to the second wave at the fourth port relative to that at the second port; and a 2×2 Multimode Interference (MMI) coupler extended further in the lengthwise direction from the third cross-section plane to an output plane having a first output port and a second output port disposed respectively in bar position relative to the third port and the fourth port, and configured to separately output a first output light in TE0 mode substantially originated from the input light in TE0 mode and a second output light in TE0 mode substantially originated from the input light in TM0 mode;

wherein the rib structure waveguide with symmetrically tapered shapes comprises a top-layer overlying a bottom-layer extended in the lengthwise direction through a first length from the input port to a joint plane and a second length from the joint plane to the first cross-section plane, the top-layer being characterized with increasing widths through the first length from a first common width at the input port to a top width at the joint plane and further with increasing widths through the second length from the top width to a second common width at the first cross-section plane, the bottom-layer being characterized with varying widths through the first length from the first common width at the input port to a bottom width at the joint plane and further through the second length from the bottom width to a second common width;

wherein the converter is configured to make the first length to be smaller than the second length, the top width at the joint plane to be greater than the first common width and smaller than the second common width, and the bottom width at the joint plane to be greater than the top width and smaller than the second common width for converting the input light with the TM0/TE0 mode to a TE1/TE0 mode for any wavelengths in O-band from about 1260 nm to about 1340 nm, wherein the second common width is no greater than 1 µm and the second length is no greater than 33 µm.

2. The polarization splitter-rotator of claim 1, wherein the converter, splitter, phase-shifter, and 2×2 MMI coupler comprise a monolithic planar body patterned from a silicon layer of a silicon-on-insulator (SOI) substrate.

3. The polarization splitter-rotator of claim 2, wherein the silicon layer comprises a common height of proximately 220 nm.

4. The polarization splitter-rotator of claim 1, wherein the planar waveguide of the splitter is characterized with symmetrically tapered edges extended in the lengthwise direction with increasing widths in a third length started from the second common width at the first cross-section plane to a first maximum width then continuously with decreasing widths in a fourth length, and further continuously with decreasing widths in a fifth length ended at the second cross-section plane, the first port and the second port being separated from each other by a gap no smaller than 0.2 µm.

5. The polarization splitter-rotator of claim 4, wherein the splitter is configured to make the third length to be smaller than the fourth length and make the fifth length to be smaller than the third length for splitting the input light of any wavelengths in O-band from about 1260 nm to about 1340 nm, wherein the fourth length is no greater than 10 µm and the first maximum width is no greater than 2.5 µm.

6. The polarization splitter-rotator of claim 4, wherein the first wave at the first port comprises a first TE1 sub-mode originated from the input light with the TM0 mode and a first TE0 sub-mode originated from the input light with the TE0 mode, the second wave at the second port comprises a second TE1 sub-mode originated from the light with the TM0 mode and a second TE0 sub-mode originated from the light with the TE0 mode, wherein the first wave with the first TE1 sub-mode is a phase $\pi$ behind the second wave with the second TE1 sub-mode and the first wave with the first TE0 sub-mode is in-phase with the second wave with the second TE0 sub-mode.

7. The polarization splitter-rotator of claim 6, wherein the first waveguide arm of the phase shifter comprises a straight bar shape of a sixth length and a first arm width, and the second waveguide arm of the phase shifter comprises a straight bar shaped portion joined aside with a triangle shaped portion along the sixth length and a second arm width increasing from the first arm width to a second maximum width near a middle position of the six length and decreasing again to the first arm width.

8. The polarization splitter-rotator of claim 7, wherein the phase shifter is configured to make the first arm width to be no greater than 0.5 µm and the second maximum width to be no greater than twice of the first arm width for keeping the first wave at the third port in-phase relative to that at the first port through the first waveguide arm and generating the phase shift of $(\pi/2+n\pi)$ for the second wave relative to that at the second port through the second waveguide arm, wherein n is selected from 0 and 1.

9. The polarization splitter-rotator of claim 8, wherein the 2×2 MMI coupler waveguide comprises a rectangular shape having a seventh length and a second width configured to couple the first wave with the first TE1 sub-mode at the third port with the second wave with the second TE1 sub-mode with a phase difference of $(3/2)\pi$ to produce the first output light in TE0 mode at the first output port, and configured to couple the first wave with the first TE0 sub-mode at the third port with the second wave with the second TE0 sub-mode with a phase difference of $(1/2)\pi$ to produce the second output light in TE0 mode at the second output port, wherein n is selected to be 0 in a configuration of the phase shifter.

10. The polarization splitter-rotator of claim 9, wherein the seventh length is about 4 to 5 times larger than the second width for generating the first output light in TE0 mode with a transmission loss less than 1.7 dB relative to the input light in TM0 mode at the input port with any wavelength in O-band from about 1260 nm to about 1340 nm and generating the second output light in TE0 mode with a transmission loss less than 1.5 dB relative to the input light in TE0 mode at the input port with any wavelength in O-band from about 1260 nm to about 1340 nm, wherein the second output light includes −17 dB or smaller portion of the input light in TM0 mode and the first output light includes −16 dB or smaller portion of the input light in TE0 mode.

11. The polarization splitter-rotator of claim 9, wherein the second width of the 2×2 MMI coupler waveguide is about 3 µm which is greater than all widths of the converter, the splitter, and the phase-shifter.

12. The polarization splitter-rotator of claim 10, wherein the transmission loss of the first output light relative to the input light in TM0 mode and the transmission loss of the second output light relative to the input light in TE0 mode are limited in a range of about 0.5~0.8 dB substantially insensitive to all wavelengths varying from 1260 nm to 1340 nm.

13. The polarization splitter-rotator of claim 1, comprises a total length between 40 µm and 100 µm.

14. A polarization splitter-rotator for broadband operation comprising:
a converter comprising a rib structure waveguide with symmetrically tapered shapes extended in a lengthwise direction from an input port to a first cross-section plane, the converter being configured to guide an input light with mixed Transverse Magnetic (TM0) polarization mode and Transverse Electric (TE0) polarization mode from the input port to the first cross-section plane with the TM0 mode being coupled to a first order Transverse Electric (TE1) mode and the TE0 mode being coupled to a zero order TE0 mode;
a splitter comprising a planar waveguide extended further in the lengthwise direction from the first cross-section plane to a second cross-section plane having a first port and a second port separated from each other, and configured to split the input light substantially evenly in power to a first wave at the first port and a second wave at the second port;
a phase-shifter comprising a first waveguide arm coupled to the first port and a second waveguide arm coupled to the second port, the first waveguide arm being extended in the lengthwise direction to a third port of a third cross-section plane and configured to keep the first wave at the third port in-phase relative to that at the first port, the second waveguide arm being separately extended in the lengthwise direction to a fourth port of the third cross-section plane and configured to add a phase shift to the second wave at the fourth port relative to that at the second port; and a 2×2 Multimode Interference (MMI) coupler extended further in the lengthwise direction from the third cross-section plane to an output plane having a first output port and a second output port disposed respectively in bar position relative to the third port and the fourth port, and configured to separately output a first output light in TE0 mode substantially originated from the input light in TE0 mode and a second output light in TE0 mode substantially originated from the input light in TM0 mode;

wherein the rib structure waveguide with symmetrically tapered shapes comprises a top-layer overlying a bottom-layer extended in the lengthwise direction through a first length from the input port to a joint plane and a second length from the joint plane to the first cross-section plane, the top-layer being characterized with increasing widths through the first length from a first common width at the input port to a top width at the joint plane and further with increasing widths through the second length from the top width to a second common width at the first cross-section plane, the bottom-layer being characterized with varying widths through the first length from the first common width at the input port to a bottom width at the joint plane and further through the second length from the bottom width to a second common width;

wherein the converter is configured to make the first length to be greater than the second length, the top width at the joint plane to be greater than the first common width and smaller than the second common width, and the bottom width to be greater than each of the top width and the second common width for converting the input light with the TM0/TE0 mode to a TE1/TE0 mode for any wavelengths in C-band from about 1525 nm to about 1565 nm, wherein the bottom width is no greater than 1.7 µm and the first length is no greater than 16 µm.

15. The polarization splitter-rotator of claim 14, wherein the planar waveguide of the splitter is characterized with symmetrically tapered edges extended in the lengthwise direction with increasing widths in a third length started from the second common width at the first cross-section plane to a first maximum width then continuously with decreasing widths in a fourth length, and further continuously with decreasing widths in a fifth length ended at the second cross-section plane, the first port and the second port being separated from each other by a gap no smaller than 0.2 µm.

16. The polarization splitter-rotator of claim 15, wherein the splitter is configured to make the third length to be greater than the fourth length and make the fifth length to be substantially zero for splitting the input light of any wavelengths in C-band from about 1525 nm to about 1565 nm, wherein the third length is no greater than 1.2 µm and the first maximum width is no greater than 1.6 µm.

17. The polarization splitter-rotator of claim 15, wherein the first wave at the first port comprises a first TE1 sub-mode originated from the input light with the TM0 mode and a first TE0 sub-mode originated from the input light with the TE0 mode, the second wave at the second port comprises a second TE1 sub-mode originated from the light with the TM0 mode and a second TE0 sub-mode originated from the light with the TE0 mode, wherein the first wave with the first TE1 sub-mode is a phase π behind the second wave with the second TE1 sub-mode and the first wave with the first TE0 sub-mode is in-phase with the second wave with the second TE0 sub-mode.

18. The polarization splitter-rotator of claim 17, wherein the first waveguide arm of the phase shifter comprises a straight bar shape of a sixth length and a first arm width, and the second waveguide arm of the phase shifter comprises a straight bar shaped portion joined aside with a triangle shaped portion along the sixth length and a second arm width increasing from the first arm width to a second maximum width near a middle position of the six length and decreasing again to the first arm width.

19. The polarization splitter-rotator of claim 18, wherein the phase shifter is configured to make the first arm width to be no greater than 0.5 µm and the second maximum width to be no greater than twice of the first arm width for keeping the first wave at the third port in-phase relative to that at the first port through the first waveguide arm and generating the phase shift of $(\pi/2+n\pi)$ for the second wave relative to that at the second port through the second waveguide arm, wherein n is selected from 0 and 1.

20. The polarization splitter-rotator of claim 19, wherein the 2×2 MMI coupler waveguide comprises a rectangular shape having a seventh length and a second width configured to couple the first wave with the first TE0 sub-mode at the third port with the second wave with the second TE0 sub-mode with a phase difference of $(3/2)\pi$ to produce the first output light in TE0 mode at the first output port, and configured to couple the first wave with the first TE1 sub-mode at the third port with the second wave with the second TE1 sub-mode with a phase difference of $(1/2)\pi$ to produce the second output light in TE0 mode at the second output port, wherein n is selected to be 1 in another configuration of the phase shifter.

21. The polarization splitter-rotator of claim 20, wherein the seventh length is about 3 to 4 times larger than the second width for generating the first output light in TE0 mode with a transmission loss less than 1.3 dB relative to the input light in TE0 mode at the input port with any wavelength in C-band from about 1525 nm to about 1565 nm and generating the second output light in TE0 mode with a transmission loss less than 1.4 dB relative to the input light in TM0 mode at the input port with any wavelength in C-band from about 1525 nm to about 1565 nm, wherein the second output light includes −21 dB or smaller portion of the input light in TE0 mode and the first output light includes −19 dB or smaller portion of the input light in TM0 mode.

22. The polarization splitter-rotator of claim 21, wherein the transmission loss of the first output light relative to the input light in TE0 mode and the transmission loss of the second output light relative to the input light in TM0 mode are limited in a range of 0.3 dB substantially insensitive to all wavelengths varying from 1525 nm to 1565 nm.

* * * * *